(12) United States Patent
Knutson et al.

(10) Patent No.: US 9,200,185 B2
(45) Date of Patent: Dec. 1, 2015

(54) POLYOLEFIN BASED HOT MELT ADHESIVE COMPOSITION

(71) Applicant: Adherent Laboratories, Inc., St. Paul, MN (US)

(72) Inventors: Keith C. Knutson, St. Paul, MN (US); Thomas H. Quinn, St. Paul, MN (US); William L. Bunnelle, Ham Lake, MN (US)

(73) Assignee: ADHERENT LABORATORIES, INC., St. Paul, MN (US)

( * ) Notice: Subject to any disclaimer, the term of this patent is extended or adjusted under 35 U.S.C. 154(b) by 0 days.

(21) Appl. No.: 14/464,296

(22) Filed: Aug. 20, 2014

(65) Prior Publication Data

US 2015/0080511 A1    Mar. 19, 2015

Related U.S. Application Data

(62) Division of application No. 13/458,361, filed on Apr. 27, 2012.

(60) Provisional application No. 61/480,177, filed on Apr. 28, 2011.

(51) Int. Cl.
| | | |
|---|---|---|
| *C08L 23/06* | (2006.01) | |
| *C08L 23/04* | (2006.01) | |
| *C09J 123/14* | (2006.01) | |
| *C08K 5/134* | (2006.01) | |
| *C08K 5/13* | (2006.01) | |

(52) U.S. Cl.
CPC ............. *C09J 123/14* (2013.01); *C08K 5/134* (2013.01); *C09J 123/142* (2013.01); *C08K 5/13* (2013.01); *C08L 2205/025* (2013.01); *Y10T 428/1334* (2015.01); *Y10T 428/1352* (2015.01); *Y10T 428/249985* (2015.04); *Y10T 428/31645* (2015.04); *Y10T 428/31667* (2015.04); *Y10T 428/31692* (2015.04); *Y10T 428/31801* (2015.04); *Y10T 428/31804* (2015.04); *Y10T 428/31902* (2015.04); *Y10T 428/31913* (2015.04); *Y10T 428/31938* (2015.04)

(58) Field of Classification Search
CPC .... C09J 123/142; C09J 123/14; C08K 5/135; C08K 5/005; C08K 5/13; C08L 91/06; C08L 23/0815; C08L 51/06
See application file for complete search history.

(56) References Cited

U.S. PATENT DOCUMENTS

| | | | | |
|---|---|---|---|---|
| 4,567,223 A | * | 1/1986 | Ames | 524/489 |
| 6,624,253 B2 | * | 9/2003 | Nakamura et al. | 525/240 |
| 8,258,227 B2 | * | 9/2012 | Kawabe et al. | 524/487 |

* cited by examiner

*Primary Examiner* — Nathan M Nutter
(74) *Attorney, Agent, or Firm* — Seager, Tufte & Wickhem, LLP

(57) ABSTRACT

A hot melt adhesive composition includes at least a semi-crystalline copolymer of propylene and a polyethylene wax having a Brookfield viscosity of about 20 cP to 500 cP at 140° C., a density of about 0.95 g/cm$^3$ to 0.99 g/cm$^3$ between 23° C. and 25° C., and a Mettler drop point of about 110° C. to 135° C., wherein the composition is characterized by a effective set time of about 0.1 second to 5 seconds. Articles including the composition and methods of making articles including the composition are described.

15 Claims, 1 Drawing Sheet

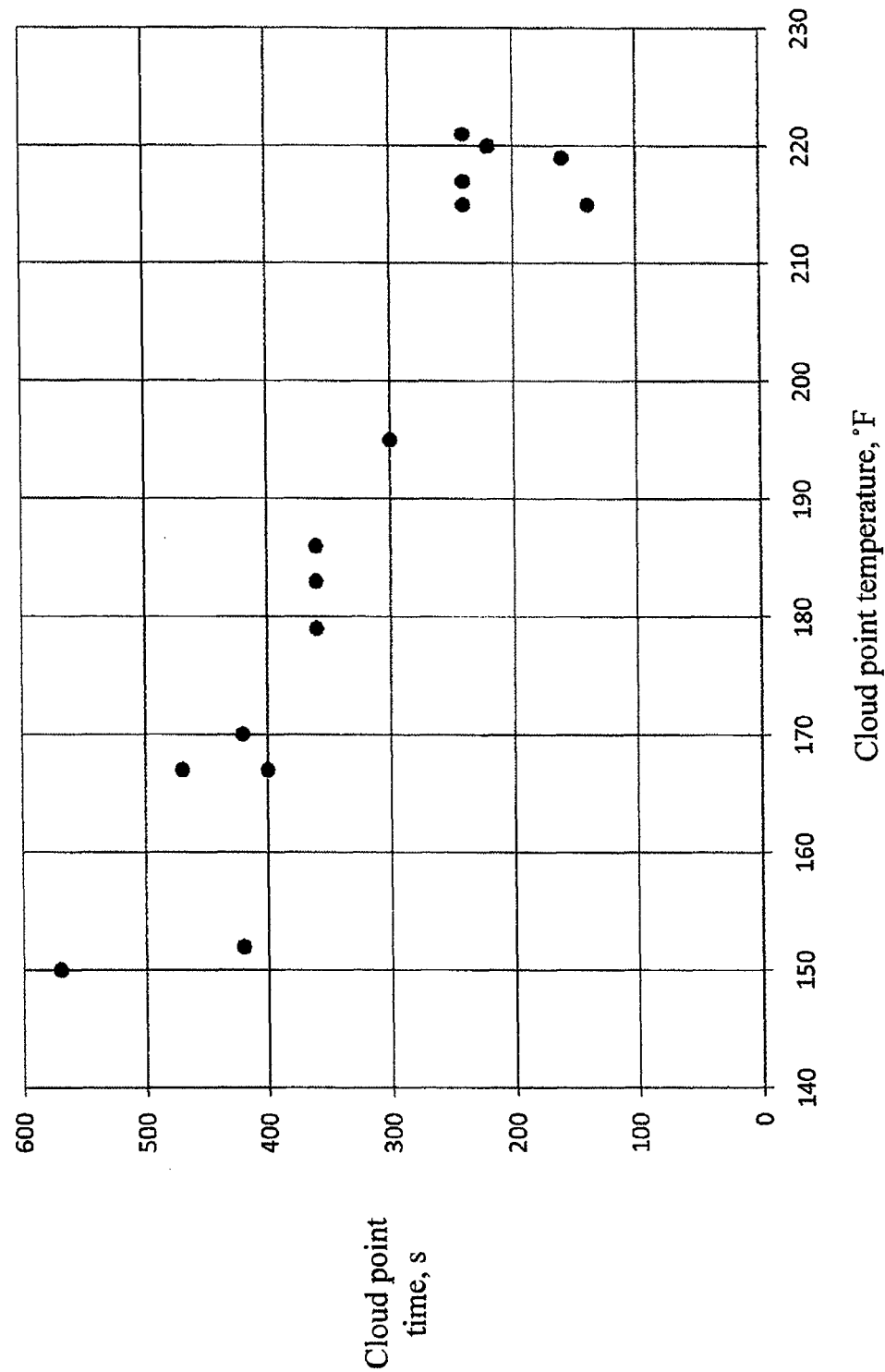

POLYOLEFIN BASED HOT MELT ADHESIVE COMPOSITION

CROSS REFERENCE TO RELATED APPLICATION

This application is a divisional application of U.S. application Ser. No. 13/458,361, filed Apr. 27, 2012, which claims priority to U.S. Provisional Patent Application No. 61/480,177, filed Apr. 28, 2011, entitled "Polyolefin Based Hot Melt Adhesive Composition", both of which applications are hereby incorporated by reference in their entirety.

FIELD OF THE INVENTION

The invention relates to hot melt polyolefin based adhesive compositions that provide a unique set of properties compared with conventional polyolefin based hot melt adhesives. The invention further relates to articles incorporating the composition, and methods of use.

BACKGROUND OF THE INVENTION

Hot melt adhesives are defined as adhesives that are applied from the melt and that build both adhesive and cohesive strength upon resolidification and crystallization of one or more components of the adhesive composition. Because hot melt adhesives are applied without solvents, increasing regulation of VOC emissions in recent years has caused an increase in demand for new and better performing hot melt adhesive formulations.

Hot melt adhesive compositions are formulations that include one or more structural or base polymers and, typically, one or more adjuvants. Adjuvants typically include functional materials or diluents such as tackifying resins, plasticizers, fillers, oils and waxes or other low molecular weight polymers. The base polymer is typically the major component of a hot melt adhesive formulation and contributes cohesive strength to the adhesive. Copolymers of ethylene and a mono-olefinically unsaturated polar comonomer such as vinyl acetate, methyl acrylate, acrylic acid and the like, are widely used as the base polymer component in many hot melt adhesive compositions. Another class of hot melt adhesives employs copolymers of ethylene or propylene with one or more relatively nonpolar α-olefins such as 1-butene, 1-hexene, and the like. Hot melt adhesive formulations employing nonpolar polymers, while less common in the industry than their EVA and other similar polar polymer based counterparts, are known. Examples of some such formulations are disclosed in U.S. Pat. Nos. 4,072,735; 5,118,762; and 4,568,713 to name just a few examples.

U.S. Pat. No. 6,747,114 discloses hot melt adhesive formulations employing metallocene polymerized propylene copolymers, wherein the comonomer is ethylene and/or a $C_4$-$C_{20}$ α-olefin as the base polymer in the formulation. The highly isotactic or syndiotactic propylene content of the metallocene polymerized base polymers imparts crystallizable content to the base polymers; the metallocene polymerized propylene copolymers are called semicrystalline copolymers. As used herein and as applied to semicrystalline copolymers, the term "crystallizable" describes those sequences which are mainly amorphous in the undeformed state, but can crystallize upon stretching, annealing or in the presence of a nucleating agent, such as a crystalline compound or another segment within the polymer. Crystalline content of the solidified semicrystalline copolymers increases the cohesive strength of the hot melt adhesives. Hot melt adhesive formulations based on metallocene polymerized propylene-based semicrystalline copolymers can eventually build sufficient crystalline content over time to achieve good cohesive strength in the formulation.

However, such formulations suffer from the drawback that the slow rate of crystalline content formation, retards cohesive strength formation. For many potential end uses, the rate of crystallization of the crystallizable content of the metallocene polymerized propylene-based semicrystalline copolymers is unacceptably long and results in a significant delay in effective adhesive bonding and reduced productivity. Attempts to accelerate the rate of crystallization have centered on the use of nucleating agents. U.S. Pat. No. 6,747,114 discloses metallocene polymerized propylene-based semicrystalline copolymers hot melt adhesive formulations having about 10 to 25 wt. % of a Fischer-Tropsch wax and/or 5% of a low molecular weight isotactic polypropylene homopolymer in order to affect crystalline content in the semicrystalline copolymer-based hot melt adhesive.

While the nucleation agents described above effectively increase the ultimate degree of crystalline content, as evidenced e.g. by a higher ultimate tensile strength of the adhesive, they do not address the rate of nucleation and crystal formation at a given temperature. Slow rate of crystallization is evidenced by a long effective set time: that is, a relatively long period of time between application of the hot melt adhesive formulation and the ability of the formulation to cause a bond to form between two adherends of sufficient strength for the envisioned application. In fact, the effective set time of the metallocene polymerized propylene-based semicrystalline copolymer hot melt adhesive formulations of the art is too slow for many industrially significant commercial applications.

Additionally, the high level of wax included in some such formulations can result in lower ultimate adhesive strength when the adhesive is completely crystallized. For example, one known application of Fischer-Tropsch waxes is as a mold release. The greater the amount of wax in the formulation, the greater the amount present at the adhesive-substrate interface and the greater its effect upon reduced ultimate adhesion and release.

Thus there is a need in the industry to obtain hot melt adhesive compositions based on metallocene polymerized propylene-based semicrystalline copolymer that builds crystalline content quickly. There is a need in the industry to obtain such adhesives having a low wax content. There is a need for such hot melt adhesive compositions to have the properties of melt rheology, adhesion, and cohesive strength widely associated with conventional hot melt adhesive formulations.

SUMMARY OF THE INVENTION

Disclosed herein are hot melt adhesive compositions based on semicrystalline polypropylene copolymers having one or more comonomers selected from the group including ethylene and a $C_4$ to $C_{20}$ α-olefin. The hot melt adhesive compositions have excellent rheological properties in the melt, enabling their application by conventional hot melt adhesive application equipment. The hot melt adhesive compositions of the invention provide excellent adhesive performance for a wide range of industrially useful applications. The hot melt adhesive compositions of the invention have a short effective set time compared to known hot melt adhesive formulations based on metallocene polymerized propylene copolymers. The hot melt adhesive compositions of the invention include a specific set of nucleating agents that cause a significant decrease in the effective set time of the adhesives compared to the effective set time of previously disclosed hot melt adhesives based on metallocene polymerized polypropylene copolymers. The simple combination of a nucleating agent plus a metallocene polymerized polypropylene copolymer possess the above mentioned fast effective set time in the absence of tackifying agents, plasticizers, extending agents, or any other adhesive components. In some embodiments, additional components such tackifying agents, plasticizers, extending agents, or others are added to the hot melt adhesive compositions of the invention; in such embodiments the effective set time remains short and is not compromised by the additional components. The nucleating agents are present in the hot melt adhesive compositions of the invention at 0.1 wt % to 15 wt % based on the total weight of the composition.

One aspect of the invention is an improved hot melt adhesive composition having an improved effective set time. Another aspect of the invention is an improved hot melt adhesive composition wherein the onset of nucleation occurs at temperatures above about 80° C. Another aspect of the invention is an improved hot melt adhesive composition having a nucleating agent composed of a polyethylene having a density of greater than 0.95 g/cm$^3$. Another aspect of the invention is an article of manufacture including a hot melt adhesive composition of the invention. Another aspect of the invention is a method of making an article of manufacture by applying a hot melt adhesive composition of the invention to a first substrate and rapidly joining the first substrate to a second substrate to form an adhesive bond that is of sufficient strength for the intended end use.

Additional advantages and novel features of the invention will be set forth in part in the description that follows, and in part will become apparent to those skilled in the art upon examination of the following, or may be learned through routine experimentation upon practice of the invention.

DESCRIPTION OF THE DRAWINGS

FIG. 1 shows a plot of cloud point time vs. cloud point temperature for compositions of the invention.

DETAILED DISCUSSION OF THE INVENTION

Definitions

As used herein, the term "propylene copolymer" or "base copolymer" means a semicrystalline copolymer of propylene and at least one monomer selected from the group including ethylene and a $C_4$ to $C_{20}$ α-olefin.

As used herein, the term "nucleating agent" means a compound or class of compounds that decrease the effective set time of a hot melt composition.

As used herein, the term "crystalline content" means a compound or a portion of a compound that is capable of forming crystalline structure.

As used herein, the term "effective set time" means the amount of time elapsed between application of a molten hot melt adhesive composition to a first substrate, and formation of an adhesive bond between the first substrate and a second substrate that is of sufficient strength for an intended end use.

As used herein, the term "cloud point temperature" means the temperature measured according to the "Cloud Point Test Protocol" described below.

As used herein, the term "cloud point time" means the time measured according to the "Cloud Point Test Protocol" described below.

As used herein, the term "open time" means the amount of time elapsed between application of a molten hot melt adhesive composition to a first substrate, and the time when wetting out of the adhesive on a substrate effectively ceases due to solidification of the adhesive composition. Open time is also referred to as "working time."

As used herein, the term "substrate" means any item having at least a partially solid surface with which contact with a hot melt adhesive composition is intended. In some cases the same area, bead, line, or dot of hot melt adhesive composition is contacted to two or more substrates for the purpose of creating an adhesive bond between them. In some such cases the substrates are part of the same item: for example, two sides of a cardboard sheet folded over, wherein the two sides are adhesively bonded together. In other such cases the substrates are part of different items: for example, a plastic film that is adhesively bonded to a cardboard sheet. The substrates are porous or nonporous.

As used herein, the term "substantially" means the same or uniform but allowing for or having minor fluctuations from a defined property, definition, etc. For example, small measurable or unmeasurable fluctuations in a measured property described herein, such as viscosity, melting point, etc. may result from human error. Other fluctuations are caused by variations in the manufacturing process, thermal history of a formulation, and the like. The adhesive compositions of the invention, nonetheless, would be said to be substantially having the property as reported.

Description of the Hot Melt Adhesive Compositions.

Various embodiments will now be described in detail. Reference to various embodiments does not limit the scope of the claims attached hereto. Additionally, any examples set forth in this specification are not intended to be limiting and merely set forth some of the many possible embodiments for the appended claims.

In various embodiments, the hot melt adhesive compositions of the invention include a copolymer of propylene and at least one monomer selected from the group including ethylene and a $C_4$ to $C_{20}$ α-olefin. In embodiments, the propylene copolymers are polymerized using a metallocene catalyst and associated polymerization techniques. Metallocene catalysts are well known in the patent and non-patent literature and have been used to form propylene polymers having varying but reproducible stereoregular content. Suitable catalysts include bis-metallocene complexes having cyclopentadienyl ligands capable of producing polymerized propylene sequences that are either isotactic or syndiotactic. A list of some metallocene ligands, as well as cocatalysts useful in conjunction with the metallocene catalysts in the syntheses of stereoregular propylene polymers, is found in U.S. Pat. No. 6,747,114. Some transition metal compound components are described in U.S. Pat. Nos. 5,145,819; 5,243,001; 5,239,022; 5,329,033; 5,296,434; 5,276,208; 5,672,668, 5,304,614 and 5,374,752; and in European Patent Publication Nos. EP549900 and EP576970. Further, any of the techniques described in these documents, as well as others widely found in the art, can be employed to make propylene copolymers that are useful in the hot melt adhesive compositions of the invention.

In embodiments, the propylene copolymer is a copolymer of propylene and ethylene. In other embodiments, the propylene copolymer is a copolymer of propylene and an α-olefin (linear 1-alkene). In some such embodiments the α-olefin is 1-butene. In other embodiments the α-olefin is 1-hexene. In still other embodiments, the propylene copolymer includes propylene, ethylene, and an α-olefin. In embodiments, the average propylene content of the propylene copolymer is about 80 mol % to 99.9 mol %, in some embodiments about 90 mol % to 99 mol %. In embodiments, the propylene copolymer is semicrystalline when in a solid state. In embodiments some repeat unit sequences in the propylene copolymer are isotactic; in other embodiments some repeat unit sequences in the propylene copolymer are syndiotactic. In embodiments, crystalline content in the propylene copolymer is derived from isotactic or syndiotactic block-like sequences.

The propylene copolymers useful in the hot melt adhesive compositions of the invention have a tensile strength measured according to ASTM E28 of about 50 to 600 psi, in some embodiments about 75 to 450 psi, in some embodiments about 300 to 4000 kPa, and in some embodiments 500 to 3100 kPa. The propylene polymers useful in the hot melt adhesive compositions of the invention have a Brookfield viscosity measured at 190° C. according to ASTM D3236 (spindle #27, 5 RPM on a Brookfield viscometer) of about 200 cP to 25,000 cP, in embodiments about 400 cP to 10,000 cP, in embodiments about 600 cP to 5000 cP, and in embodiments about 700 cP to 2000 cP. The propylene copolymers useful in the hot melt adhesive compositions of the invention have a density in solid form of about 0.860 g/cm$^3$ to 0.868 g/cm$^3$. The propylene copolymers useful in the hot melt adhesive compositions of the invention have a peak melting temperature of about 131° C. to 170° C.

In embodiments, the propylene copolymer is a copolymer of propylene and at least one comonomer selected from the group consisting of ethylene and $C_4$ to $C_{20}$ α-olefins, wherein the copolymer has a propylene content of greater than 65 mole %, a weight average molecular weight ($M_w$) of about 15,000 g/mol to 200,000 g/mol, a melt index of about 7 dg/min to 3000 dg/min as measured by ASTM D 1238(B), a polydispersity (weight average molecular weight/number average molecular weight ratio, or $M_w/M_n$) of about 1.5 to 3, a melt flow rate of 250 dg/min or greater at 230° C., and a heat of fusion of about 30 J/g to 80 J/g as determined by differential scanning calorimetry (DSC). One example of a propylene copolymer that is useful in the hot melt adhesive compositions of the invention is LINXAR™ 127, obtained from ExxonMobil Chemical of Houston, Tex. Another example of a propylene copolymer that is useful in the hot melt adhesive compositions of the invention is VISTAMAXX™ 2230, also available from ExxonMobil Chemical.

In embodiments, a blend of more than one propylene copolymer is included in the hot melt adhesive compositions of the invention. The one or more propylene copolymers differ, in various embodiments, in one or more parameters such as degree of crystallinity, molecular weight, degree of branching, tacticity, monomer composition, and polydispersity. These parameters give rise to differences in physical parameters such as density, tensile strength, and degree of crystallinity, among others. Blends of more than one propylene copolymer are employed in various embodiments of the hot melt adhesive compositions of the invention in order to provide for or optimized physical properties, lower cost, or for some other reason or combination of reasons. In some embodiments, for example, a lower molecular weight, high density propylene copolymer is blended with a higher molecular weight propylene copolymer in order to provide a combination of rapid effective set time with high impact strength, improved peel and/or shear adhesion performance, low temperature adhesive performance, or a combination of one or more thereof. The total amount of the one or more propylene copolymers present in the hot melt adhesive compositions of the invention range from about 50 wt % to 99.5 wt % based on the total weight of composition, or about 70 wt % to 99 wt % based on total weight of the composition, or about 80 wt % to 95 wt % based on total weight of the composition. Blends of two or more propylene copolymer are not particularly limited as to ratios of the two or more propylene copolymers employed and can range, for example, from 1:99 by weight to 99:1 by weight of two propylene copolymers, or 10:90 by weight to 90:10 by weight for two propylene copolymers, or 25:75 to 75:25 for two propylene copolymers.

The hot melt adhesive compositions of the invention include at least the one or more propylene copolymers described above, and a nucleating agent. The nucleating agents are low molecular weight polyethylene homopolymers, or polyethylene waxes. In some embodiments the polyethylene waxes are metallocene polymerized using techniques similar to those described above for the propylene copolymers. In embodiments, the nucleating agents are low molecular weight metallocene polymerized polyethylene homopolymers. The Brookfield viscosity of the nucleating agents ranges from about 20 cP to 500 cP at 140° C. The density of the nucleating agents in solid form is about 0.95 g/cm$^3$ to 1.00 g/cm$^3$ or about 0.96 g/cm$^3$ to 0.99 g/cm$^3$, or about 0.96 g/cm$^3$ to 0.98 g/cm$^3$. The Mettler drop point of the nucleating agents is about 110° C. to 135° C., or about 125° C. to 135° C. The nucleating agents are present in the hot melt adhesive compositions of the invention at about 0.05 wt % to 15 wt % based on total weight of the composition, or at about 1 wt % to 10 wt % based on total weight of the composition, or at about 3 wt % to 7 wt % based on total weight of the composition.

Several examples of useful nucleating agents will now be described. Where reported, density of the nucleating agent is measured either at 23° C. or 25° C. One example of a nucleating agent useful in the adhesive compositions of the invention is LICOCENE® PE 4201, available from Clariant International Ltd. of Muttenz, Switzerland. LICOCENE® PE 4201 is a metallocene catalyzed polyethylene wax having a density of 0.97 g/cm$^3$, a viscosity of 40 cP to 80 cP at 140° C., and a Mettler drop point of 125° C. to 130° C. according to ASTM D3954. Another example of a nucleating agent useful in the adhesive compositions of the invention is LICOCENE® PE 5301, available from Clariant International Ltd. LICOCENE® PE 5301 is a metallocene catalyzed polyethylene wax and has a density of 0.97 g/cm$^3$, a viscosity of about 350 cP at 140° C., and a drop point of 128° C. to 133° C. according to ASTM D3954. Another example of a nucleating agent useful in the adhesive compositions of the invention is POLYWAX™ 3000 polyethylene homopolymer, available from Baker Hughes Incorporated of Sugar Land, Tex. POLYWAX™ 3000 has a density of 0.98 g/cm$^3$, a viscosity of 130 cP at 149° C. according to a modified ASTM D88 procedure, and a melting point of 129° C. according to ASTM D127. Another example of a nucleating agent useful in the adhesive compositions of the invention is POLYWAX™ 2000 polyethylene homopolymer, available from Baker Hughes Incorporated. POLYWAX™ 2000 has a density of 0.97 cm$^3$, a viscosity of 50 cP at 149° C. according to a modified ASTM D88 procedure, and a melting point of 126° C. according to ASTM D127. Another example of a nucleating agent useful in the adhesive compositions of the invention is POLYWAX™ 1000 polyethylene homopolymer, available from Baker Hughes Incorporated. POLYWAX™ 1000 has a density of 0.96 cm$^3$, a viscosity of 15 cP at 149° C. according to a modified ASTM D88 procedure, and a melting point of 113° C. according to ASTM D127. Another example of a nucleating agent useful in the adhesive compositions of the invention is POLYWAX™ 850 polyethylene homopolymer, available from Baker Hughes Incorporated. POLYWAX™ 850 has a density of 0.96 cm$^3$, a viscosity of 13 cP at 149° C.

according to a modified ASTM D88 procedure, and a melting point of 107° C. according to ASTM D127. Another example of a nucleating agent useful in the adhesive compositions of the invention is Honeywell A-C® 820A polyethylene homopolymer, available from Honeywell International Inc. A-C® 820A has a density of 0.97 g/cm³, a Brookfield viscosity of 50 cP to 150 cP at 140° C., and a Mettler drop point of 123° C. to 133° C.

In some embodiments the hot melt adhesive compositions of the invention include substantially only the propylene copolymer and the nucleating agent. In such embodiments, the nucleating agent is present at about 0.05 wt % to 15 wt % based on total weight of the composition, with the balance being the propylene copolymer. In other embodiments, the hot melt adhesive compositions of the invention include one or more additional components in order to modify various properties of the compositions for a particular end use.

Additional components employed in some embodiments of the hot melt adhesive compositions of the invention include antioxidants and free radical scavengers. These materials are commonly employed in hot melt adhesive formulations in order to increase thermal stability of thereof. This is because during use the compositions are often held at high temperatures for extended periods of time, for example in a holding tank or cartridge. Generally, hot melt adhesive formulations are heated to between about 110° C. and 200° C., in some embodiments between about 130° C. and 170° C., in still other embodiments between about 150° and 175° C., prior to application in order to reduce viscosity of the composition. The formulations must be stable at these temperatures to allow for extended periods as a molten product prior to application. In embodiments, antioxidants such as hindered phenols are employed in the hot melt adhesive compositions of the invention. Representative hindered phenols include 1,3, 5-trimethyl-2,4,6-tris(3-5-di-tert-butyl-4-hydroxybenzyl) benzene; pentaerythritol tetrakis-3(3,5-di-tert-butyl-4-hydroxyphenyl)propionate; n-octadecyl-3(3,5-ditert-butyl-4-hydroxyphenyl) propionate; 4,4'-methylenebis(4-methyl-6-tert butylphenol); 4,4'-thiobis(6-tert-butyl-o-cresol); 2,6-di-tert-butylphenol; 6-(4-hydroxyphenoxy)-2,4-bis(n-octylthio)-1,3,5-triazine; 2,4,6-tris(4-hydroxy-3,5-di-tert-butyl-phenoxy)-1,3,5-triazine; di-n-octadecyl-3,5-di-tert-butyl-4-hydroxybenzylphosphonate; 2-(n-octylthio)ethyl-3, 5-di-tert-butyl-4-hydroxybenzoate; and sorbitol hexa-(3,3,5-di-tert-butyl-4-hydroxy-phenyl) propionate. One example of a useful hindered phenol is IRGANOX® 1010 (pentaerythritol tetrakis(3-(3,5-di-tert-butyl-4-hydroxyphenyl)propionate), available from BASF Corp. of Florham Park, N.J.), and free radical scavengers such as, but not limited to, butylated hydroxytoluene or "BHT", and butylated hydroxyanisole or "BHA", available from multiple vendors. Any of these materials are advantageously added to the hot melt adhesive compositions of the invention to further enhance thermal stability. These free radical scavengers and antioxidants are generally added to the hot melt adhesive compositions of the invention in amounts ranging from about 0.01% to 5% by weight of the composition. In some embodiments stabilizers and antioxidants are employed in the fugitive adhesive compositions of the invention in amounts ranging from about 0.1% to 1.5% by weight of the composition. Since the free radical scavengers and antioxidants are optional components of the hot melt adhesive composition of the invention, any of the recited ranges include 0 wt % to any of the recited amounts in various embodiments, for example 0 wt % to 0.01 wt %, 0 wt % to 5 wt %, and so forth.

Additional components employed in some embodiments of the hot melt adhesive compositions of the invention include functionalized polyolefins, such as maleic anhydride or acrylic acid functionalized polypropylene or polyethylene. These functionalized polyolefins are added where increased adhesion to polar polymers and metal substrates are desirable. For example, in some packaging applications, acrylic coated cardboard or cardboard coated with some other relatively polar polymeric composition is commonly used. Where a hot melt adhesive composition of the invention is employed to bond such adherends, addition of a functionalized polyolefin to the composition increases the level of adhesion. Additionally, in some embodiments, maleic anhydride functional polyolefins impart improved low temperature adhesion—that is, adhesion at temperatures employed in the packaging operations carried out on refrigerated comestibles—to the hot melt adhesive compositions of the invention. In some embodiments, the maleic anhydride functional polyolefins have about maleic anhydride functionality corresponding to saponification numbers of about 20 mg KOH per gram of polymer to 90 mg KOH per gram of polymer, in some embodiments about 40 mg KOH per gram of polymer to 80 mg KOH per gram of polymer. In some embodiments, a functionalized polyolefin is incorporated into one or more hot melt adhesive compositions of the invention at about 0.1 wt % to 10 wt % based on the total weight of the composition, or at about 1 wt % to 8 wt % based on the total weight of the composition, or at about 3 wt % to 7 wt % based on the total weight of the composition. Since the functionalized polyolefin is an optional component of the hot melt adhesive composition of the invention, any of the recited ranges include 0 wt % to any of the recited amounts in various embodiments, for example 0 wt % to 0.1 wt %, 0 wt % to 10 wt %, and so forth.

Examples of some functionalized polyolefins that are usefully employed in the hot melt adhesive compositions of the invention include Honeywell A-C® 596 maleic anhydride functionalized polypropylene, available from Honeywell International Inc. of Morristown, N.J.; POLYBOND® acrylic acid or maleic anhydride functionalized polypropylenes, available from Chemtura Corp. of Middlebury, Conn.; and EPOLENE® maleic anhydride functionalized polyethylenes, available from Westlake Polymers LLC of Houston, Tex.; or any of the polymers described in U.S. Pat. Nos. 5,955,547 and 6,046,279.

An alternative route to adding functionalized polyolefins, such as those described above, to the hot melt adhesive compositions of the invention is direct chemical modification of the propylene copolymer or another component of the hot melt adhesive composition. In embodiments, modifying the propylene copolymer achieves variability in one or more properties of the hot melt adhesive compositions of the invention for a particular end use, without substantially changing the other desirable properties of the propylene copolymer in its role as the base polymer in the hot melt adhesive compositions of the invention. In one such embodiment, the propylene copolymers are partially maleated. Methods used to maleate propylene homopolymers or copolymers are found, for example, in U.S. Pat. Nos. 4,315,863; 5,001,197; 5,420, 303; 7,256,236; 7,659,346. Any of the methods and amounts of maleation described in these and other references in the art are useful in conjunction with one or more components of the hot melt adhesive compositions of the invention to impart maleic anhydride functionality thereto.

Additional components employed in some embodiments of the hot melt adhesive compositions of the invention include tackifying resins. Tackifying resins, or tackifiers, typically have low molecular weights and are resinous, and have glass transition and softening point temperatures well above typical room temperatures. In some embodiments, tackifying resins are based on natural products, for example terpenes, which are based on polymerized α- or β-pinene based compounds. In other embodiments, petroleum-based hydrocarbon resins are tackifying resins useful in the hot melt adhesive compositions of the invention. Such materials are often formed by polymerization of aliphatic hydrocarbon materials to form an amorphous polymer. In embodiments, the petroleum hydrocarbon resin is hydrogenated or modified with aromatic functionality to improve thermal stability. In embodiments, the tackifying resins useful in the hot melt adhesive compositions of the invention have a softening point of about 80° C. to 180° C., or in some embodiments about 100° C. to 150° C. or 80° C. to 130°. Examples of tackifying resins that are useful in the hot melt adhesive compositions of the invention include those sold by ExxonMobil Chemical under the trade name ESCOREZ®, such as ESCOREZ® 5600, 5615, 5637, and 5690; those sold by Arizona Chemical Co. of Jacksonville, Fla. under the trade name SYLVARES™; those sold by Cray Valley of Paris, France under the trade name WINGTACK®; those sold by Pinova, Inc. of Brunswick, Ga. under the trade name PICCOLYTE®; and those sold by Eastman Chemical Co. of Kingsport, Tenn. under the trade names EASTOTAC® and REGALREZ®. In embodiments where tackifying resin is employed in the hot melt adhesive compositions of the invention, it is added at about 1 wt % to 30 wt % based on the total weight of the composition, or about 5 wt % to 20 wt % based on the total weight of the composition. Since the tackifier is an optional component of the hot melt adhesive composition of the invention, any of the recited ranges include 0 wt % to any of the recited amounts in various embodiments, for example 0 wt % to 1 wt %, 0 wt % to 30 wt %, and so forth.

Additional components employed in some embodiments of the hot melt adhesive compositions of the invention include one or more conventional waxes. In some embodiments, conventional waxes are added to the hot melt adhesive compositions of the invention to adjust the melt viscosity. In some embodiments, conventional waxes are added to the hot melt adhesive compositions of the invention to increase the hot tack of the hot melt adhesive compositions of the invention; that is, the level of "grab" of the compositions to an intended substrate when molten. In some embodiments, conventional waxes are added to the hot melt adhesive compositions of the invention to increase the low temperature adhesion performance of the of the hot melt adhesive compositions of the invention. In some embodiments, the conventional waxes are added to the hot melt adhesive compositions of the invention to increase peel adhesion performance, shear adhesion performance, or both. In some embodiments, the conventional wax is a petroleum based paraffin wax, a Fischer-Tropsch wax, or a low molecular weight polyethylene or polypropylene wax. In embodiments where conventional wax is employed in the hot melt adhesive compositions of the invention, the amount used is between about 1 wt % to 15 wt % based on total weight of the composition, or about 2 wt % to 10 wt % based on total weight of the composition, or about 3 wt % to 7 wt % based on total weight of the composition, or about 1 wt % to 5 wt % based on total weight of the composition. Since the conventional wax is an optional component of the hot melt adhesive composition of the invention, any of the recited ranges include 0 wt % to any of the recited amounts in various embodiments, for example 0 wt % to 1 wt %, 0 wt % to 15 wt %, and so forth.

Paraffin waxes are hydrocarbon mixtures with the general formula $C_nH_{2n+2}$ wherein $20 \leq n \leq 40$. Straight chain saturated hydrocarbons are the predominant functionality, though there are typically small amounts of unsaturated and/or branched hydrocarbons. Paraffin waxes are usually produced as a by-product of oil refining and differ from one another chiefly in melting point, which in turn is attributable to differences in the distribution of hydrocarbons of various formula weights. Paraffin waxes are available from a broad range of sources including consumer sources. Fischer-Tropsch waxes are synthetic waxes produced by the Fischer-Tropsch process, which is a method for the synthesis of hydrocarbons and other aliphatic compounds from a mixture of hydrogen and carbon monoxide in the presence of a catalyst. The gaseous mixture is obtained by coal gasification or natural gas reforming. The waxes are fractionated by chain length and are characterized as substantially saturated and linear aliphatic chains free of aromatic, sulfurous, and nitrogenous content. Fischer-Tropsch waxes are available from a number of sources. Some Fischer-Tropsch waxes useful in the hot melt adhesive compositions of the invention include those marketed under the trade name SASOLWAX®, for example SASOLWAX® C 80 and SASOLWAX® H 1, available from Sasol Wax North America Corp. of Hayward, Calif.; those marketed under the trade name VESTOWAX® available from Evonik Degussa of Essen, Germany; and those marketed under the trade name ACUMIST® available from Honeywell International Inc. of Morristown, N.J. Low molecular weight polyethylene or polypropylene waxes, other than those polymerized by metallocene catalysts, are low molecular weight polymers made by direct polymerization of ethylene and propylene under conditions whereby molecular weight is controlled. These polymer waxes are available from a number of sources; polymer waxes useful in the hot melt adhesive compositions of the invention include Marcus 200, 300, 500, 4040, and 2000 waxes from Marcus Oil and Chemical Corp. of Houston, Tex.; BARECO® C-4040 wax from Baker Hughes of Barnsdall, Okla.; and EPOLENE® C-10, C-18, and N-15 from Westlake Chemical Corp. of Houston, Tex.

Additional components employed in some embodiments of the hot melt adhesive compositions of the invention include one or more additional polymers. The one or more additional polymers are added to complement the propylene copolymer as the base polymer. The one or more additional polymers must be compatible with the propylene copolymer; that is, they do not undergo substantial phase separation from the hot melt adhesive composition either in the melt or during and after solidification and crystallization of the propylene copolymer. Other than this limitation, the specific type and the amount of the additional polymer(s) used in the hot melt adhesive compositions of the invention are not particularly limited. In some embodiments, the one or more additional polymers is a higher molecular weight polymer and increases the cohesive strength of the hot melt adhesive compositions of the invention. In some embodiments, the addition of one or more additional polymers increases the peel strength of the hot melt adhesive compositions of the invention after application to the intended substrate. In some embodiments, the one or more additional polymers are lower in crystalline content than the propylene copolymer under the same conditions. In some embodiments, the one or more additional polymers are elastomers. In some embodiments, the one or more additional polymers increase the hot tack of the hot melt adhesive compositions of the invention; that is, the level of "grab" of the compositions to an intended substrate when molten. In some embodiments, the one or more additional polymers increase the low temperature adhesion performance of the of the hot melt adhesive compositions of the invention. In some embodiments, the one or more additional polymers are added to decrease the overall cost of the compositions of the invention without compromising key physical properties as otherwise described herein. In embodiments of the hot melt adhesive compositions of the invention where one or more additional polymers are employed, the one or more additional polymers are included in the composition at about 0.01 wt % to 30 wt % based on the total weight of the composition; or about 1 wt % to 20 wt % based on the total weight of the composition; or about 3 wt % to 10 wt % based on the total weight of the composition. Since the additional polymer is an optional component of the hot melt adhesive composition of the invention, any of the recited ranges include 0 wt % to any of the recited amounts in various embodiments, for example 0 wt % to 0.01 wt %, 0 wt % to 30 wt %, and so forth.

Some examples of additional polymers useful in the hot melt adhesive compositions of the invention include polyolefins such as polyethylene, polypropylene, and copolymers thereof such as polypropylene based elastomers sold by ExxonMobil Chemical of Houston, Tex. under the trade name VISTAMAXX™ and polyethylene based elastomers such as those sold by Dow Chemical Company of Midland, Mich. under the trade names AFFINITY™ and ENGAGE™. Other useful additional polymers include block copolymers such as those sold by Kraton Polymers U.S. LLC of Houston, Tex. under the trade name KRATON® G; those sold by Kuraray Co., Ltd. of Tokyo, Japan under the trade name SEPTON®; those sold by Polimeri Europa of Milan, Italy under the trade name EUROPRENE® SOL T; those sold by Dexco Polymers LP of Plaquemine, La. under the trade name VECTOR™; and others, including any of the block copolymers described in U.S. Pat. No. 6,846,876.

Some examples of additional polymers that are particularly useful in the hot melt adhesive compositions of the invention include the polyolefin elastomers VISTAMAXX™ 2230, AFFINITY™ GA 1900, AFFINITY™ GA 1950, and ENGAGE™ 8200. AFFINITY™ GA 1900 has a density of 0.870 g/cm$^3$ according to ASTM D792, heat of fusion of 46.1 J/g, and a Brookfield viscosity of 8200 cP at 177° C. according to ASTM D 1084. AFFINITY™ GA 1950 has a density of 0.874 g/cm$^3$ according to ASTM D792, heat of fusion of 53.4 J/g, and a Brookfield viscosity of 17,000 cP at 177° C. according to ASTM D 1084. ENGAGE™ 8200 has a density of 0.87 g/cm$^3$ according to ASTM D792 and a melt index of 5 g/10 min at 190° C. These olefin elastomers are compatible with the propylene copolymers useful in the hot melt adhesive compositions of the invention and improve physical properties such as low temperature adhesive performance without sacrificing effective set time.

Other types and amounts of additives usefully employed with the fugitive adhesives of the invention are not particularly limited and include, in various embodiments, colorants (dyes or pigments), bleaches, plasticizers, surfactants such as cationic, anionic, zwitterionic, or nonionic surfactants, and fillers as well as combinations of one or more thereof. In various embodiments, where they are used, such additives are each added to the hot melt adhesive compositions of the invention at amounts of about 0.001 wt % to 5 wt % based on the total weight of the composition, or about 0.01 wt % to 3 wt % based on the total weight of the composition.

The hot melt adhesive compositions of the invention are formed using conventional techniques. Procedures and methods for formulating hot melt adhesive compositions are well known in the art. Any of these procedures may be used to blend and prepare the hot melt adhesive compositions of the invention. The method of blending and preparing the hot melt adhesive compositions of the invention is not particularly limited. Descriptions of those procedures and methods are reviewed, for example, in Skeist, Irving, *Handbook of Adhesives*, Van Nostrand Reinhold International; 3rd edition (1990).

The hot melt adhesive compositions of the invention have melt rheology and thermal stability suitable for use with conventional hot melt adhesive application equipment. The blended components of the hot melt adhesive compositions of the invention have low melt viscosity at the application temperature, thereby facilitating flow of the compositions through a coating apparatus, e.g., coating die or nozzle, without resorting to the inclusion of solvents or extender oil into the composition. Melt viscosities of the hot melt adhesive compositions of the invention are between 100 cP and 10,000 cP measured at 180° C. according to ASTM D 3236. In embodiments, the melt viscosity at 180° C. is about 300 cP to 5000 cP according to ASTM D3236.

The hot melt adhesive compositions of the invention have a Ring and Ball softening point, according to ASTM D638 of about 120° C. to 150° C., in some embodiments about 135° C. to 145° C. and an open time of at least about 5 seconds, for example about 5 seconds to 30 seconds or more, in embodiments about 5 seconds to 20 seconds or 10 seconds to 20 seconds. The hot melt adhesive compositions of the invention have effective set times of about 5 seconds or less, for example about 0.1 second to 5 seconds, in embodiments about 0.1 second to 3 seconds, and in some embodiments about 0.2 second to 1 second. The effective set time of the hot melt adhesives of the invention are unexpectedly short, particularly given that the open time remains in the acceptable range.

We have discovered that the effective set time of the hot melt adhesive compositions of the invention are effectively ranked by measuring the cloud point time and cloud point temperature of the composition, wherein the cloud point time and cloud point temperature are measured according to the following Cloud Point Test Protocol.

Cloud Point Test Protocol i. Melt blend a propylene copolymer and a nucleating agent at a 98:2 weight ratio by heating 196 g of the propylene copolymer in a beaker at 177° C. until liquid, then slowly adding 4 g of nucleating agent and mixing with an electric stirrer (Heidolph RZR 2021, available from Heidolph USA of Elk Grove Village, Ill.) until a homogeneous mixture is formed.

ii. Place a 15 mm×100 mm heat resistant glass test tube into a wire test tube rack. Insert a thermocouple probe, 4.5 mm diameter, into the tube so that the leading end of the probe touches the bottom of the tube. Pour 5 g of the mixture into the bottom of the test tube and place the tube, probe, and rack together in an oven set to 177° C. (350° F.), leaving the thermocouple wire to protrude from the oven.

iii. Monitor the temperature of the sample using the thermocouple. Remove the rack containing the tube and thermocouple from the oven when the temperature reaches 177° C. (about 30 minutes) and set on a laboratory bench wherein the ambient temperature is 20° C. to 24° C.

iv. Start a stopwatch.

v. Observe the mixture as it cools. When the mixture is sufficiently opaque that the portion of the probe immersed in the mixture is no longer visible when viewing the mixture horizontally through the walls of the test tube, record the temperature and the time. The recorded temperature is the cloud point temperature. The recorded time is the cloud point time.

The mixtures having a cloud point temperature of at least 80° C. (176° F.), such as 80° C. to about 110° C. (230° F.), or about 88° C. (190° F.) to 110° C. are mixtures that, when employed alone or with other components as a hot melt adhesive composition, have set times of 5 seconds or less. The mixtures having a cloud point time of less than 350 seconds, such as 350 seconds to about 100 seconds, or about 300 seconds to 150 seconds are mixtures that, when employed alone or with other components as a hot melt adhesive composition, have set times of 5 seconds or less.

Thus, a first aspect of the invention is a hot melt adhesive composition comprising a semicrystalline copolymer of propylene and at least one comonomer selected from the group consisting of ethylene and $C_4$ to $C_{20}$ α-olefins, wherein the copolymer has a propylene content of greater than 65 mole %, a Brookfield viscosity at 190° C. of about 200 cP to 25,000 cP, and a density in solid form of about 0.860 g/cm³ to 0.868 g/cm³; and about 0.1 wt % to 15 wt % of a polyethylene wax having a Brookfield viscosity of about 20 cP to 500 cP at 140° C., density in solid form of about 0.93 g/cm³ to 0.99 g/cm³, and a Mettler drop point of about 120° C. to 145° C.; wherein the composition is characterized by a effective set time of about 0.1 second to 5 seconds. Another aspect of the invention is a hot melt adhesive composition comprising a semi-crystalline copolymer of propylene and at least one comonomer selected from the group consisting of ethylene and $C_4$ to $C_{20}$ α-olefins, wherein the copolymer has a propylene content of greater than 65 mole %, a Brookfield viscosity at 190° C. of about 200 cP to 25,000 cP, and a density in solid form of about 0.860 g/cm³ to 0.868 g/cm³; and about 0.1 wt % to 15 wt % of a polyethylene wax having a Brookfield viscosity of about 20 cP to 500 cP at 140° C., density in solid form of about 0.93 g/cm³ to 0.99 g/cm³, and a Mettler drop point of about 120° C. to 145° C.; wherein the composition is characterized by a cloud point temperature of about 80° C. to 110° C. Yet another aspect of the invention is a hot melt adhesive composition comprising a semi-crystalline copolymer of propylene and at least one comonomer selected from the group consisting of ethylene and $C_4$ to $C_{20}$ α-olefins, wherein the copolymer has a propylene content of greater than 65 mole %, a Brookfield viscosity at 190° C. of about 200 cP to 25,000 cP, and a density in solid form of about 0.860 g/cm³ to 0.868 g/cm³; and about 0.1 wt % to 15 wt % of a polyethylene wax having a Brookfield viscosity of about 20 cP to 500 cP at 140° C., density in solid form of about 0.93 g/cm³ to 0.99 g/cm³, and a Mettler drop point of about 120° C. to 145° C.; wherein the composition is characterized by a cloud point time of about 350 seconds to 100 seconds.

Application of the Hot Melt Adhesive Compositions

The hot melt adhesive compositions of the invention are be applied to a desired substrate or adherend using any of the techniques known in the art, including conventional techniques used in packaging. In embodiments, a coating head or nozzle, with associated equipment for preheating and holding a reservoir of molten adhesive composition is used. Such equipment is manufactured, for example, by the Nordson Corp. of Westlake, Ohio; ITW Dynatec of Hendersonville, Tenn.; and Hot Melt Technologies of Rochester Hills, Mich. In embodiments, the hot melt adhesive compositions of the invention are applied as beads, fine lines, dots, patches, or spray coatings; in a continuous or intermittent fashion; or generally in any fashion in which conventional hot melt adhesive formulations are applied. Spray-on application involves delivery of adhesive from a plurality of narrow orifices in the form of fibers, threads or filaments having a substantially circular cross section with a diameter less than 0.12 cm, in some embodiments about 0.02 to 0.002 cm. Fine line or spiral spray patterns are used in various embodiments. The hot melt adhesives of the invention are extruded, whether by spray or other application apparatuses, in a molten state onto a first substrate. The second substrate is then applied on top of the adhesive to bond the first and second substrates together. In some embodiments wherein the first, second, or both substrates are porous (for example, a polypropylene nonwoven, or a cellulose tissue), more than two substrate layers are adhesively bonded together by one applied aliquot of hot melt adhesive composition of the invention followed by application of pressure to the substrates/adhesive composition layers during the open time. For example, a first, nonporous substrate such as a plastic film or sheet is provided, onto which a bead of a hot melt adhesive composition of the invention is applied. Then two or more layers of porous substrates such as, for example, a cotton batting, a thermoplastic nonwoven fabric such as a polyolefin or polyester nonwoven fabric, and/or a woven fabric such as a cotton or cotton/polyester blend woven fabric, are placed on top of the first substrate and pressure is applied, for example by a roller, to cause all the substrates to become adhesively affixed. Adhesion of multiple layers in this manner is possible because the adhesive can be extruded directly onto a substrate.

In embodiments where spray application is employed, the hot melt adhesive compositions of the invention reach ambient temperatures upon immediate contact with the adherend. This is because the spray-on adhesive takes on the form of fibers that have substantial surface area in comparison to the mass of the fiber. Sprayed adhesives take the form of a solid matrix formed as a result of the combined adhesive fibers creating an overlapping distribution of threads or fibers on a substrate. In some embodiments, ambient temperature of the packaging adhesive application is between about 10° C. to 40° C. It is a substantial advantage of the hot melt adhesive compositions of the invention that in all such applications, the effective set time of the adhesive is less than 5 seconds, and in many embodiments is about 0.1 to 1 second.

The amount of the hot melt adhesive composition of the invention that is applied between two or more substrates in order to achieve satisfactory adhesive bonding will vary depending on both the particular composition as well as the challenges expected in the particular application, as will be appreciated by one of skill. In many embodiments, the hot melt adhesive compositions of the invention are applied by a machine spraying a cylindrical bead of adhesive onto a first substrate, wherein the first substrate is defined as the substrate upon which the adhesive is applied in molten form. The cylinder flattens out upon contact with the first substrate and flattens further upon contact with a second substrate. In such embodiments, the cross sectional area of the adhesive bead as applied by the nozzle is determined by the diameter of the bead of hot melt adhesive composition as it leaves the nozzle. In embodiments, the diameter of the bead of hot melt adhesive composition applied to a first substrate is about 0.75 millimeters to 1 centimeter, or about 1.0 millimeters to 6.5 millimeters, or about 1.5 millimeters to 3.5 millimeters. The length of the bead applied to the substrate depends on the size of the substrate and the length of the bond required between the first and second substrates. The length of the bead will vary depending on the application and the size and type of substrates being employed. Thus, in an illustrative example, where a 1 centimeter long bead is applied to the first substrate, the volume of hot melt adhesive composition applied is 4.4 mm³ in the case of an 0.75 millimeter cylindrical bead diameter or 3.1 cm³ in the case of a 1 centimeter cylindrical bead diameter.

Typical but nonlimiting industrial applications of the hot melt adhesive compositions of the invention include packaging, particularly for low temperature use such as for dairy products or for freezer packaging of food products, and in sanitary disposable consumer articles, for example, diapers, feminine care pads, napkins, etc. Traditional end use applications such as book-binding, wood working and labeling will also benefit from both the low temperature flexibility, heat resistance and the efficiency of end use in automated means of applying the hot melt adhesive compositions of the invention to various substrates.

Articles of the invention include items having any two or more substrates adhesively bonded by a hot melt adhesive composition of the invention. Articles of the invention include cartons, boxes, envelopes, comestibles containers, books, magazines, disposable articles such as diapers or feminine napkins, and the like. The substrates that are adhesively bonded in such articles are formed from materials such as cardboard, paper, wood, aluminum, tin, steel, thermoplastics such as polyesters such as polyethylene terephthalate, polyamides such as nylons, or polypropylene, thermoset polymers, glass, ceramics, and combinations, blends, or layered composites thereof and include, in some embodiments, coatings of wax, acrylate polymers, or other materials; colorants, preservatives, stabilizers, processing lubricants, and the like as well as combinations of any of these materials. The substrates include solid, nonporous items and sheets as well as porous items and sheets, such as nonwoven fabrics, paper, cotton batting, and the like.

In industrial applications, the rapid effective set time of the hot melt adhesive compositions of the invention provide a broader scope of utility than are realized with conventional hot melt adhesives, and in particular those hot melt adhesives based on metallocene polymerized propylene copolymers known in the art. Productivity in terms of throughput on a conveyor belt system, for example, is greatly increased by the rapid effective set time provided by the hot melt adhesive compositions of the invention. For example, some industrial packaging applications currently do not employ hot melt adhesives because the effective set time is several seconds, such as between 5 and 15 seconds or longer, must pass between application of the molten adhesive to the first substrate before an adhesive bond between the first substrate and a second substrate can form, wherein the adhesive bond is of sufficient strength to continue to the next step in the process without the adherends parting ways. Such effective set times mean that a conveyor type system for packaging is limited by the time it takes for the hot melt adhesive to build adhesion. In some embodiments, the hot melt adhesive compositions of the invention have an effective set time of less than 5 seconds, and in some embodiments the effective set time is as short as 0.1 second. Such a rapid effective set time is, for industrial purposes, "instant", and represents a significant advantage for industrial uses of hot melt adhesives. A rapid effective set time enables the use of the hot melt adhesive composition in industrial applications that previously did not employ hot melt adhesives because the long effective set time represented a bottleneck in productivity. Alternatively, the rapid effective set time of the hot melt adhesive compositions of the invention enables a significant improvement in productivity where hot melt adhesives based on metallocene polymerized propylene copolymers are currently employed.

In some embodiments, the application of the hot melt adhesive compositions of the invention is a packaging application. In some such embodiments, one or more packaging substrates are plain cardboard, corrugated cardboard, plain paper, or a combination thereof. In some embodiments, one or more packaging substrates have a surface coating of a wax or a polymer such as an acrylate polymer. In still other such embodiments, one or more packaging substrates has a metalized surface or is otherwise composed of one or more metal materials. It is an advantage of the hot melt adhesive compositions of the invention that in various embodiments, the compositions provide adhesive bonding to all such substrates. That is, various hot melt adhesive compositions are suitably formulated to include various additional components such as any of those described above, to provide excellent adhesive bonding to an intended substrate at an intended use temperature and in an intended amount; and in each case, the adhesive composition retains the rapid effective set time of about 0.1 second to 5 seconds.

Despite this short effective set time, the hot melt adhesives of the invention retain an acceptably long open time. In embodiments, the open time of the hot melt adhesives of the invention is about 2 seconds to 15 seconds, or about 3 seconds to 10 seconds.

Once two or more substrates are contacted with a hot melt adhesive composition of the invention disposed between them, the composition must build both adhesion to each substrate as well as cohesive strength in order to secure the substrates with an adhesive bond. Thus, the rate of formation of these properties is critical in a hot melt adhesive application. The rate of crystallization of the semicrystalline propylene polymer controls the rate at which the hot melt adhesive compositions build cohesive strength. One measure of the rate of crystallization in such formulations is the cloud point. The cloud point is the time between application of the molten adhesive to a substrate and formation of visual evidence of crystalline content, i.e. opacity. We have found that the measurement of cloud point is indicative of the effective set time of the hot melt adhesive compositions of the invention. Further details regarding cloud point and its measurement are provided above as well as in the Experimental portion of this description.

When applied to a substrate, the hot melt adhesive compositions of the invention have shear adhesion fail temperature (SAFT) and peel adhesion fail temperature (PAFT) of over 100° C. when measured on Kraft paper according to a modified ASTM-D4498 test. In some embodiments, the SAFT of the hot melt adhesive compositions of the invention on Kraft paper is about 110° C. to 140° C., or about 120° C. to 130° C. Further, the peel adhesion fail temperature (PAFT) of the hot melt adhesive compositions of the invention on Kraft paper is at least about 40° C., for example about 45° C. to 80° C., or about 50° C. to 70° C. Further, within less than 5 seconds of contacting the adhesive composition to a second sheet of Kraft paper, an adhesive bond is formed that has sufficient strength to result in fiber tear when the sheets are pulled apart. The adhesive bond strength and cohesive strength at 5 seconds or less of effective set time is also sufficient to result in fiber tear when the substrates are two plain cardboard layers.

Thus, a first aspect of the invention is a hot melt adhesive composition comprising a semi-crystalline copolymer of propylene and at least one comonomer selected from the group consisting of ethylene and $C_4$ to $C_{20}$ αolefins, wherein the copolymer has a propylene content of greater than 65 mole %, a Brookfield viscosity at 190° C. of about 200 cP to 25,000 cP, and a density of about 0.860 g/cm³ to 0.868 g/cm³; and about 0.1 wt % to 15 wt % of a polyethylene wax having a Brookfield viscosity of about 20 cP to 500 cP at 140° C., a density of about 0.93 g/cm³ to 0.99 g/cm³, and a Mettler drop point of about 120° C. to 145° C. wherein the composition is characterized by a effective set time of about 0.1 second to 5 seconds.

Another aspect of the invention is a method of manufacture employing the hot melt adhesive compositions of the invention. The method involves application of the molten compositions to a substrate, followed by contact of the adhesive composition with a second substrate within 0.1 second to 5 seconds after application of the adhesive composition to the first substrate, wherein the contacting results in an adhesive bond between the substrates.

Yet another aspect of the invention is an article of manufacture including the hot melt adhesive compositions of the invention, wherein the article includes at least two substrates adhesively bonded by an amount of a hot melt adhesive composition. Typical articles of manufacture include packaged goods, particularly packaged goods intended for low temperature use such as in dairy products or for freezer packaging of food products; sanitary disposable consumer articles, for example, diapers, feminine care pads, napkins, and the like; books and magazines; labeled articles; wood articles such as furniture; and articles formed from a combination of low energy and higher energy materials, for example a cardboard box having a polyethylene wrap and/or a polypropylene label, or a wood frame table having a protective plastic top. In general, articles that are advantageously bonded using the hot melt adhesive compositions of the invention benefit from both the low temperature flexibility, heat resistance and the efficiency of end use in automated means of applying the invention compositions to substrates.

EXPERIMENTAL

Examples 1-5

Hot melt adhesive compositions were formulated by melt blending as described below, wherein specific components and amounts of the components are shown in Table 1.

TABLE 1

Hot melt adhesive components for Examples 1-5.

| | | Wt % of Component | | | | |
| --- | --- | --- | --- | --- | --- | --- |
| Component | Supplier | Ex. 1 | Ex. 2 | Ex. 3 | Ex. 4 | Ex. 5 |
| LINXAR ™ 127 | ExxonMobil Chemical, Houston, TX | 84 | 84 | 84 | 84 | 84 |
| AC ®-596 | Honeywell Intl. Inc., Morristown, NJ | 5 | 5 | 5 | 5 | 5 |
| VISTAMAXX ® 2330 | ExxonMobil Chemical | 5 | 5 | 5 | 5 | 5 |
| IRGANOX ® 1010 | Ciba Geigy Ltd., Basel, Switzerland | 1 | 1 | 1 | 1 | 1 |
| LICOCENE ® 4201 | Clariant Intl.Ltd., Muttenz, Switzerland | 1 | 0 | 1 | 1 | 1 |
| A-C ® 9A | Honeywell Intl. Inc. | 4 | 5 | | | |
| A-C ® 820A | Honeywell Intl. Inc. | | | 4 | | |
| Marcus 200 | Marcus Oil and Chem. Corp., Houston, TX | | | | 4 | |
| SASOLWAX ® C-80 | Sasol Wax N. Am. Corp., Hayward, CA | | | | | 4 |

To form the compositions, all of the components except VISTAMAXX® 2330 were heated at 177° C. until melted. Mechanical mixing was started at a moderate rate of speed while the VISTAMAXX® 2330 was slowly added until dissolved and the sample homogeneous. The final composition temperature was about 177° C.

A portion of each composition was removed for analysis. Each composition was analyzed for Brookfield Thermosel Viscosity (spindle SC4-29) at 177° C., Mettler softening point, Shear Adhesion Fail Temperature (SAFT) and Peel Adhesion Fail Temperature (PAFT) according to a modified ASTM-D4498 test. SAFT and PAFT values were determined as follows. Each sample was coated onto kraft paper by hand using glass rods or shims. The resultant coatings were one inch (2.5 cm) wide bands about 8-10 mils (about 0.2-0.25 mm) or about 0.008 to about 0.010 inches (about 0.02 to about 0.03 cm) thick. Four to five such bonds were made for the peel (PAFT) test and four to five bonds were made for the shear (SAFT) test and the results were averaged. The samples were placed in a programmed oven after attaching 100 g weights for PAFT and 500 g weights for SAFT, and ramping the temperature from 25° C. to 100° C. at 25° C./hour. The oven automatically recorded the temperature at which the samples failed.

The viscosities of the compositions were all between 1000 cP and 2000 cP at 190° C. The Mettler Drop Point for the compositions was between 120° C. and 140° C. The SAFT and PAFT, results for the compositions are shown in Table 2.

Also shown in Table 2 are cloud point ratings. Cloud point ratings were determined as follows. A 10 g aliquot of each adhesive composition was placed in an aluminum foil pan and the pan was placed in an oven set to 350° F. (177° C.) for about 30 minutes, at which time the compositions had become molten. The foil pans were then removed from the oven and set on a benchtop and rated with a number based on when each of the compositions turned cloudy (first composition to turn cloudy was rated 1, second rated 2, and so forth). The results of the rating are also shown in Table 2 as "cloud point rating."

TABLE 2

Physical properties measured for Examples 1-5.

| Example No. | SAFT, ° F. | PAFT, ° F. | Cloud pt rating |
| --- | --- | --- | --- |
| 1 | 247 | 116 | 2 |
| 2 | 242 | 110 | — |
| 3 | 248 | 111 | 1 |
| 4 | 243 | 109 | 4 |
| 5 | 242 | 112 | 3 |

Examples 6-18

Cloud point time and cloud point temperature imparted to the LINXAR® 127 polymer by various nucleation agents was measured according to the Cloud Point Test Protocol:

Cloud Point Test Protocol vi. Melt blend a propylene copolymer and a nucleating agent at a 98:2 weight ratio by heating 196 g of the propylene copolymer in a beaker at 177° C. until liquid, then slowly adding 4 g of nucleating agent and mixing with an electric stirrer (Heidolph RZR 2021, available from Heidolph USA of Elk Grove Village, Ill.) until a homogeneous mixture is formed.

vii. Place a 15 mm×100 mm heat resistant glass test tube into a wire test tube rack. Insert a thermocouple probe, 4.5 mm diameter, into the tube so that the leading end of the probe touches the bottom of the tube. Pour 5 g of the mixture into the bottom of the test tube and place the tube, probe, and rack together in an oven set to 177° C. (350° F.), leaving the thermocouple wire to protrude from the oven.

viii. Monitor the temperature of the sample using the thermocouple. Remove the rack containing the tube and thermocouple from the oven when the temperature reaches 177° C. (about 30 minutes) and set on a laboratory bench wherein the ambient temperature is 20° C. to 24° C.

ix. Start a stopwatch.

x. Observe the mixture as it cools. When the mixture is sufficiently opaque that the portion of the probe immersed in the mixture is no longer visible when viewing the mixture horizontally through the walls of the test tube, record the temperature and the time. The recorded temperature is the cloud point temperature. The recorded time is the cloud point time.

The nucleation agents employed in the Cloud Point Test are shown in Table 3, along with their densities as reported by the supplier. Each nucleation agent was mixed at 2 wt % with 98 wt % LINXAR® 127 (obtained from ExxonMobil Chemical of Houston, Tex.) according to the test protocol to give the Example number indicated in Table 3.

TABLE 3

Nucleating agents employed in the Cloud Point Test for Examples 6-18 and Control (C).

| Ex. | Nucleation Agent | Supplier | Density, g/cm³ at 23-25° C. |
|---|---|---|---|
| C1 | None (100% LINXAR ® 127) | N/A | N/A |
| 6 | POLYWAX ® 3000 | Baker Hughes Inc., Sugar Land, TX | 0.98 |
| 7 | POLYWAX ® 2000 | Baker Hughes Inc., Sugar Land, TX | 0.97 |
| 8 | LICOCENE ® PE 5301 | Clariant Intl. Ltd., Muttenz, Switzerland | 0.97 |
| 9 | LICOCENE ® PE 4201 | Clariant Intl. Ltd., Muttenz, Switzerland | 0.97 |
| 10 | A-C ® 820A | Honeywell Intl. Inc., Morristown, NJ | 0.97 |
| 11 | POLYWAX ® 1000 | Baker Hughes Inc., Sugar Land, TX | 0.96 |
| 12 | POLYWAX ® 850 | Baker Hughes Inc., Sugar Land, TX | 0.96 |
| 13 | BARECO ® C4040 | Baker Hughes Inc., Sugar Land, TX | 0.95 |
| 14 | POLYWAX ® 600 | Baker Hughes Inc., Sugar Land, TX | 0.94 |
| 15 | Marcus 300 | Marcus Oil and Chem. Corp., Houston, TX | 0.94 |
| 16 | SASOLWAX ® H1 | Sasol Wax N. Am. Corp., Hayward, CA | 0.94 |
| 17 | A-C ® 9A | Honeywell Intl. Inc., Morristown, NJ | 0.93 |

TABLE 3-continued

Nucleating agents employed in the Cloud Point Test for Examples 6-18 and Control (C).

| Ex. | Nucleation Agent | Supplier | Density, g/cm³ at 23-25° C. |
|---|---|---|---|
| 18 | SASOLWAX ® C-80 | Sasol Wax N. Am. Corp., Hayward, CA | 0.92 |

The results of measurement of cloud point time and cloud point temperature for Control (C) and Examples 6-19 are shown in Table 4. FIG. 1 shows a plot of cloud point time vs. cloud point temperature from Table 4.

TABLE 4

Cloud point temperature and cloud point time for Examples 6-18 and Control, measured according to the Cloud Point Test.

| Ex. | Cloud Point Temp., ° C. | Cloud Point Time, s |
|---|---|---|
| C1 | 65 | 570 |
| 6 | 104 | 220 |
| 7 | 105 | 240 |
| 8 | 104 | 160 |
| 9 | 102 | 139 |
| 10 | 102 | 240 |
| 11 | 91 | 300 |
| 12 | 84 | 360 |
| 13 | 86 | 360 |
| 14 | 77 | 420 |
| 15 | 75 | 470 |
| 16 | 82 | 360 |
| 17 | 75 | 400 |
| 18 | 67 | 420 |

Examples 19-32

PAFT, SAFT, and low temperature adhesive bond performance were determined for various hot melt adhesive compositions of the invention. Hot melt adhesive compositions were formulated by melt blending as described above, wherein specific components and amounts of the components are shown in Table 5. All component amounts are shown in weight percent based on the total weight of the composition. LINXAR® 127 was obtained from ExxonMobil Chemical of Houston, Tex. LICOCENE® PE 4201 was obtained from Clariant International Ltd. of Muttenz, Switzerland. A-C® 596 was obtained from Honeywell International Inc. of Morristown, N.J. AFFINITY® GA 1900, AFFINITY® GA 1950, and ENGAGE® 8200 were obtained from the Dow Chemical Company of Midland, Mich. EPOLENE® C-10 and EPOLENE® C-18 were obtained from Westlake Polymers LLC of Houston, Tex.

TABLE 5

Hot melt adhesive compositions C2 and Examples 19-31.

| Example | LINXAR ® 127 | LICOCENE ® PE 4201 | A-C ® 596 | AFFINITY ® GA 1950 | AFFINITY ® GA 1900 | ENGAGE ® 8200 | EPOLENE ® C-10 | EPOLENE ® C-18 |
|---|---|---|---|---|---|---|---|---|
| C2 | 90 | 5 | 5 | | | | | |
| 19 | 80 | 5 | 5 | 10 | | | | |
| 20 | 70 | 5 | 5 | 20 | | | | |
| 21 | 80 | 5 | 5 | | 10 | | | |
| 22 | 70 | 5 | 5 | | 20 | | | |
| 23 | 60 | 5 | 5 | | 30 | | | |
| 24 | 50 | 5 | 5 | | 40 | | | |

TABLE 5-continued

Hot melt adhesive compositions C2 and Examples 19-31.

| Example | LINXAR® 127 | LICOCENE® PE 4201 | A-C® 596 | AFFINITY® GA 1950 | AFFINITY® GA 1900 | ENGAGE® 8200 | EPOLENE® C-10 | EPOLENE® C-18 |
|---|---|---|---|---|---|---|---|---|
| 25 | 40 | 5 | 5 |  | 50 |  |  |  |
| 26 | 88 | 5 | 5 |  |  | 2 |  |  |
| 27 | 86 | 5 | 5 |  |  | 4 |  |  |
| 28 | 82 | 5 | 5 |  |  | 8 |  |  |
| 29 | 86 | 3 | 5 |  |  |  |  | 6 |
| 30 | 82 | 3 | 5 |  |  |  |  | 10 |
| 31 | 87 | 3 | 5 |  |  |  | 6 |  |

Viscosity at 177° C., PAFT, and SAFT were determined using the test protocols described above. Additionally, low temperature bond performance was tested according to the following protocol. A bead of adhesive approximately 1/16-1/8" diameter (1.6-3.2 mm) is applied at 177° C. lengthwise to a 1"×3" piece of corrugated cardboard. Then a second piece of corrugated cardboard is placed on top of the adhesive bead within 3 seconds, and a 500 g weight is placed on top of the second piece of corrugated cardboard for at least 5 seconds. Then the samples are placed in a freezer set to −18° C. for about 24 hours. Then the samples are removed from the freezer and immediately pulled apart by hand. The amount of fiber tear was recorded in increments of 25%, that is, 0%, 25%, 50%, 75%, or 100%.

The results of PAFT, SAFT, and low temperature adhesive bond performance are shown in Table 6.

TABLE 6

Viscosity at 177° C., PAFT, SAFT, and low temperature adhesive bond performance of C2 and some compositions of Examples 19-31.

| Example | Viscosity at 177° C. (350° F.), cP | PAFT, °F. | SAFT, °F. | Low Temp. Adhesive Bond Performance, % |
|---|---|---|---|---|
| C2 | 1010 | 126 | 257 | 25 |
| 19 | 1340 | 125 | 252 | 100 |
| 20 | 1700 | 113 | 244 | 100 |
| 21 | 1300 | 112 | 250 | 100 |
| 22 | 1550 | 114 | 243 | 100 |
| 23 | 2320 | 111 | 123 | 100 |
| 26 | 1050 | 126 | 253 | 25 |
| 27 | 1200 | 125 | 249 | 25 |
| 28 | 1390 | 124 | 258 | 0 |
| 29 | 170 | 143 | 251 | 100 |
| 30 | 1150 | 126 | 254 | 100 |
| 31 | 1125 | 137 | 252 | 100 |

The present invention may suitably comprise, consist of, or consist essentially of, any of the disclosed or recited elements. The invention illustratively disclosed herein can be suitably practiced in the absence of any element which is not specifically disclosed herein. The various embodiments described above are provided by way of illustration only and should not be construed to limit the claims attached hereto. It will be recognized that various modifications and changes may be made without following the example embodiments and applications illustrated and described herein, and without departing from the true spirit and scope of the following claims.

We claim:

1. A hot melt adhesive composition comprising:
   (a) a copolymer of propylene and at least one comonomer selected from the group consisting of ethylene and $C_4$ to $C_{20}$ α-olefins, wherein the copolymer has a propylene content of greater than 65 mole %, a Brookfield viscosity at 190° C. of about 200 cP to 25,000 cP, and a density of about 0.860 $g/cm^3$ to 0.868 $g/cm^3$; and
   (b) about 0.1 wt % to 15 wt % of a polyethylene wax having a Brookfield viscosity of about 20 cP to 500 cP at 140° C., a density of about 0.95 $g/cm^3$ to 0.99 $g/cm^3$ between 23° C. and 25° C., and a Mettler drop point of about 110° C. to 135° C.,
wherein the composition is characterized by an effective set time of about 0.1 second to 5 seconds.

2. The composition of claim 1 wherein the copolymer has a propylene content of about 80 mole % to 99.9 mole %.

3. The composition of claim 1 wherein the comonomer is ethylene, 1-hexene or a combination thereof.

4. The composition of claim 1, the adhesive comprising about 50 wt % to 99.5 wt % of the copolymer.

5. The composition of claim 1, the adhesive comprising about 80 wt % to 95 wt % of the copolymer.

6. The composition of claim 1, the adhesive comprising about 1 wt % to 10 wt % of the polyethylene wax.

7. The composition of claim 1 wherein the polyethylene wax has a density of about 0.96 $g/cm^3$ to 0.99 $g/cm^3$.

8. The composition of claim 1 wherein the polyethylene wax has a density of about 0.97 $g/cm^3$ to 0.99 $g/cm^3$.

9. The composition of claim 1, the adhesive further comprising about 0.01 wt % to 5 wt % of a hindered phenol compound.

10. The composition of claim 1, the adhesive further comprising about 0.1 wt % to 10 wt % of a functionalized polyolefin comprising functional groups derived from maleic anhydride or acrylic acid.

11. The composition of claim 1, the adhesive further comprising about 1 wt % to 30 wt % of a tackifying resin having a softening point of about 80° C. to 180° C.

12. The composition of claim 1, the adhesive further comprising about 1 wt % to 15 wt % of a paraffin wax, a Fischer-Tropsch wax, or a non-metallocene polymerized polyethylene or polypropylene wax.

13. The composition of claim 1, the adhesive further comprising about 0.01 wt % to 30 wt % of an additional polymer.

14. The composition of claim 1 wherein the effective set time is about 0.1 second to 2 seconds.

15. The composition of claim 1 wherein the effective set time is less than 1 second.

* * * * *